US012775979B2

(12) United States Patent
Nonni et al.

(10) Patent No.: US 12,775,979 B2
(45) Date of Patent: Oct. 27, 2026

(54) INTERFACES AND TECHNIQUES FOR SECURE TRANSACTION FUNDING

(71) Applicant: NCR Voyix Corporation, Atlanta, GA (US)

(72) Inventors: Bryan Walser Nonni, Atlanta, GA (US); Abdulwahab Jarkas, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/653,048

(22) Filed: May 2, 2024

(65) Prior Publication Data

US 2024/0273622 A1 Aug. 15, 2024

Related U.S. Application Data

(62) Division of application No. 17/488,828, filed on Sep. 29, 2021, now Pat. No. 11,983,769.

(51) Int. Cl.

| | |
|---|---|
| ***G06Q 40/03*** | (2023.01) |
| ***G06F 9/451*** | (2018.01) |
| ***G06F 9/54*** | (2006.01) |
| ***G06Q 20/20*** | (2012.01) |
| ***G06Q 20/36*** | (2012.01) |
| ***G06Q 20/38*** | (2012.01) |
| ***G06Q 20/40*** | (2012.01) |

(52) U.S. Cl.
CPC ............. *G06Q 40/03* (2023.01); *G06F 9/451* (2018.02); *G06Q 20/202* (2013.01); *G06Q 20/367* (2013.01); *G06Q 20/381* (2013.01); *G06Q 20/40* (2013.01); *G06F 9/54* (2013.01)

(58) Field of Classification Search
CPC .... G06Q 40/03; G06Q 20/202; G06Q 20/367; G06Q 20/381; G06Q 20/40; G06Q 20/0655; G06Q 20/24; G06Q 20/405; G06F 9/451; G06F 9/54
USPC ........................................................... 705/21
See application file for complete search history.

(56) References Cited

U.S. PATENT DOCUMENTS 10,949,918 B2 3/2021 Fidanza et al.
11,288,736 B1 3/2022 Jette et al.
(Continued)

OTHER PUBLICATIONS

Gupta, Rahul et al. Acceptance Towards Digital Payments and Improvements in Cashless Payment Ecosystem. 2020 International Conference for Emerging Technology (INCET), 2020. (Year: 2020).*
(Continued)

*Primary Examiner* — Fawaad Haider
(74) *Attorney, Agent, or Firm* — Schwegman Lundberg & Woessner, P.A.

(57) ABSTRACT

When a consumer checkouts out, the transaction interface presents a buy now pay later option selected by the consumer for payment of a transaction. Consumer information is collected through the interface and a registered financial institution (FI) is presented the transaction details and information for servicing a loan. Terms are provided from the FI and presented to the consumer through the interface. Acceptance by the consumer causes a smart contract with the terms and parties of the loan to be generated in a blockchain (BC) and payment processed by the BC by transferring funds from a FI wallet to a retailer wallet associated with the transaction.

6 Claims, 3 Drawing Sheets

(s)(56) References Cited

U.S. PATENT DOCUMENTS

| | | | | |
|---|---|---|---|---|
| 11,373,161 | B2 | 6/2022 | Wang | |
| 11,568,376 | B2 | 1/2023 | Filter et al. | |
| 2018/0349478 | A1 | 12/2018 | Carlisle et al. | |
| 2019/0228409 | A1* | 7/2019 | Madisetti | G06Q 40/03 |
| 2021/0241256 | A1* | 8/2021 | Caldwell | G06Q 20/02 |
| 2021/0326978 | A1 | 10/2021 | Hsu | |
| 2022/0044213 | A1 | 2/2022 | Yan | |
| 2022/0147993 | A1 | 5/2022 | Fazliu et al. | |

OTHER PUBLICATIONS

U.S. Appl. No. 17/488,828 U.S. Pat. No. 11,983,769, filed Sep. 29, 2021, Interfaces and Techniques for Secure Transaction Funding.

"U.S. Appl. No. 17/488,828, Non Final Office Action mailed Aug. 25, 2023", 9 pgs.

"U.S. Appl. No. 17/488,828, Notice of Allowance mailed Jan. 10, 2024", 11 pgs.

"U.S. Appl. No. 17/488,828, Response filed Jul. 17, 2023 to Restriction Requirement mailed May 17, 2023", 8 pgs.

"U.S. Appl. No. 17/488,828, Response filed Nov. 27, 2023 to Non Final Office Action mailed Aug. 25, 2023", 9 pgs.

"U.S. Appl. No. 17/488,828, Restriction Requirement mailed May 17, 2023", 6 pgs.

* cited by examiner

INTERFACES AND TECHNIQUES FOR SECURE TRANSACTION FUNDING

CROSS-REFERENCE TO RELATED APPLICATION

This application is a division of U.S. patent application Ser. No. 17/488,828, filed Sep. 29, 2021, which application and publication is incorporated herein by reference in its entirety.

BACKGROUND

Buy now and pay later is a widely popular option with merchants and consumers. The concept is that a third-party service provider extends credit to a consumer desiring to make a purchase in a store of the merchant. An accepted consumer is given immediately credit and the third-party service provider pays the merchant in full for the customer's purchase. The risk associated with the consumer not paying back the terms of the loan are absorbed by the third-party service provider and the merchant is paid immediately.

However, service providers and merchants have significant obstacles to overcome. Profit margins are tight for merchants doing business in a competitive market space and the merchants are forced to incur significant fees by way of reduced product prices to use the service providers. The service providers typically have slow loan processing in efforts to minimize their risks and reduce costs with limited underwriting resources. Furthermore, consumers must avail themselves to this payment option at specific locations within a merchant store and as a result, there is limited availability within a merchant store for a consumer to access this option.

Some of the service providers are startups that are operating at a loss even though these providers essentially charge consumers upwards of a 30% Annual Percentage Yield (APY) and take an affiliate/referral commission on the sale from the merchant. The commissions typically range between 6-10% depending on the partnership between the service providers and each merchant. These commissions directly eat into the slim profit margins of the merchants, but they justify the hefty commissions on the belief that they may not have made a sale absent this option to their consumers.

SUMMARY

In various embodiments, a system and methods for interfaces and techniques for secure transaction funding are provided.

According to an embodiment, a method for providing an interface and a technique for secure transaction funding is presented. A payment option is integrated into a transaction interface during a payment process for a transaction of a consumer and a screen is rendered within the transaction interface to collect consumer information from the consumer. The consumer information and a payment amount for the transaction is provided to a financial institution (FI) server. Terms of a loan associated with providing the payment amount for the transaction during the payment process of the transaction interface are received from the FI server. A second screen is rendered within the transaction interface to present the terms for an acceptance. A smart contract is generated on a blockchain for the loan between the consumer and a FI associated with the FI server causing funds associated with the payment amount to be transferred from a FI digital wallet to a retailer wallet for a retailer associated with the transaction and further causing the payment process to conclude within the transaction interface.

DETAILED DESCRIPTION

Figure 1:
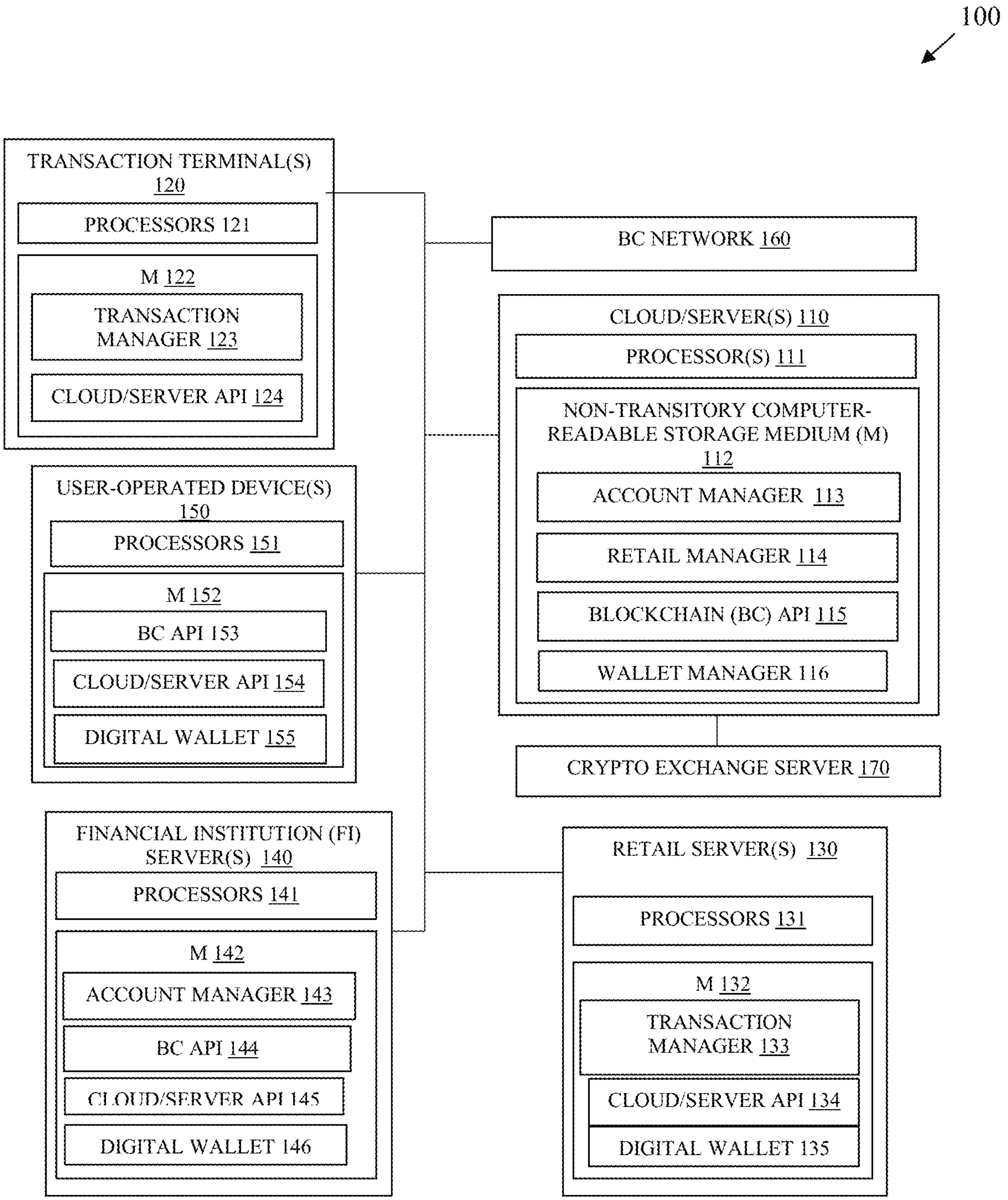
FIG. 1 is a diagram of a system for interfaces and techniques for secure transaction funding, according to an example embodiment.

FIG. 1 is a diagram of a system/platform 100 for interfaces and techniques for secure transaction funding, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of interfaces and techniques for secure transaction funding, presented herein and below.

System/platform 100 (herein after just "system 100") provides a processing environment by which contracts (e.g., loans) are automatically created, tracked, and managed via Blockchain (BC). The loans themselves linked to the initial funding sources within the BC and terms of the loan within the BC can automatically transfer funds from the borrowers to the lenders via digital wallets. The BC is accessed via digital wallets of the parties associated with initiation of the loan (retailer being paid, consumer taking a loan, and lender providing the loan) and continuing parties bound to the contract after initiation (lender and consumer (borrower)). Portions of the BC (associated with terms requiring a funding source or payments) also comprise programs that are automatically processed, such that a borrower when accessing the contract term associated with making a payment can provide the funds associated with payment via a wallet identifier and a cryptographic token (included in the borrower's wallet) and the funds are automatically transferred to a lender wallet via the BC (e.g. such as using an Ethereum®-based BC that supports smart contracts). The value associated with funding the contract and/or payments can include a cryptocurrency or a stable cryptographic token that is directly linked and tracked to the U.S. dollar, such as United States Dollar Coin (USDC). Current government regulations prevent many financial institutions from utilizing cryptocurrency but since the USDC is not technically a cryptocurrency and tracks directly to the U.S. dollar, these institutions can extend loans of contracts to consumers without directly purchasing and selling cryptocurrencies while still utilizing BC technology in the various manners discussed herein and below.

Application Programming Interfaces (API) are processed by the parties to access the contract utilizing their wallet identifiers associated with their loan obligations of the contract and a contract identifier/address on the BC. Again, funds can be linked to U.S. dollars (via accounts identified in the wallet) and/or linked to cryptocurrencies. A contract managed on the BC can also handle fund transfers associated with mixed currencies, such as U.S. dollars to cryptocurrency, U.S. dollars to a foreign currency, or any combination of mixed funds transfers.

As used herein, the terms "customer," "consumer," "and/or "borrower" may be used interchangeably and synonymously herein and below. This refers to an individual that has is requesting a loan for purposes of paying for purchases at a retailer.

Use of the terms "retailer" and/or "merchant" may be used interchangeably and synonymously herein and below. This refers to an entity that has is being paid by a financial institution to satisfy a payment required of a consumer during a transaction at a store (in-person or online) of the retailer/merchant.

Furthermore, use of the terms "lender," "bank," "financial institution ("FI")," and/or "creditor" may be used interchangeably and synonymously herein and below. This refers to an entity that is extending a loan to a consumer and supplying a payment required of the consumer during a transaction at a store to the associated retailer.

Use of the term "party" is dependent upon the context in which the term is used and may refer to either the lender, the borrower, or the retailer.

System 100 comprises a cloud/server 110, transaction terminals 120, retail servers 130, FI servers 140, user-operated devices 150 (hereinafter just "device 150" or "user device 150"), a BC 160, and a cryptographic ("crypto") exchange server 170.

Cloud/Server 110 comprises at least one processor 111 and a non-transitory computer-readable storage medium 112. Medium 112 comprises executable instructions for an account manager 113, a retail manager 114, a BC API 115, and wallet manager 116 (optional). The executable instructions when provided to and executed by processor 111 from medium 112 cause processor 111 to perform the processing discussed herein and below for 113-116.

Each transaction terminal 120 (hereinafter just "terminal 120") comprises at least one processor 121 and a non-transitory computer-readable storage medium 122. Medium 122 comprises executable instructions for a transaction manager 123 and a cloud/server API 124. The executable instructions when provided to and executed by processor 121 from medium 122 cause processor 121 to perform the processing discussed herein and below for 123-124.

Each retail server 130 comprises at least one processor 131 and a non-transitory computer-readable storage medium 132. Medium 132 comprises executable instructions for a transaction manager 133, a cloud/server API 134, and a digital wallet 135. The executable instructions when provided to and executed by processor 131 from medium 132 cause processor 131 to perform the processing discussed herein and below for 133-135.

Each FI server 140 comprises at least one processor 141 and a non-transitory computer-readable storage medium 142. Medium 142 comprises executable instructions for a an account manager 143, a BC API 144, a cloud/server API 145, and a digital wallet 146. The executable instructions when provided to and executed by processor 141 from medium 142 cause processor 141 to perform the processing discussed herein and below for 143-146.

Each user device 150 comprises at least one processor 151 and a non-transitory computer-readable storage medium 152. Medium 152 comprises executable instructions for a BC API 153, a cloud/server API 154, and a digital wallet 155. The executable instructions when provided to and executed by processor 151 from medium 152 cause processor 151 to perform the processing discussed herein and below for 153-155.

BC Network 160 (herein after just "BC 160") is distributed over a variety of devices that participate in the BC 160. BC 160 may be a public BC, or a private BC associated with the cloud/server 110, retailer servers 130, and/or FI servers 140.

Crypto exchange server 130 comprises a cryptographic service (exchange service) for redeeming, purchasing, and/or converting between cryptographic currencies and government-issued currencies. At any given point in time the exchange service provides an exchange value for converting between different types of currencies.

A variety of operational scenarios for system 100 is now presented.

Initially, consumers, retailers 130, and FIs 140 register with cloud/server 110 via APIs 154, 134, and 145 to wallet manager 116 for purposes of registering digital wallets 155, 135, and 146. It is to be noted that a first time a consumer is obtaining a loan as payment, digital wallet 155 for the consumer may be obtained and registered.

During a checkout with a retailer in a retail store, a consumer is either preforming a self-checkout at a Self-Service Terminal (SST) 120 or is being assisted with checkout by a cashier at a cashier operating a Point-Of-Sale (POS) terminal 120. Transaction manager 123 utilizing a transaction interface requests payment for the transaction. The transaction interface is modified to provide an option for the consumer to "buy now and pay later" offered by cloud/server 110 to both the consumer and the retailer. When the buy now and pay later option is selected, API 124 is initiated and makes a call to retailer manager 114.

Retail manager 114 provides one or more interface screens back to API 124 for presentation to the consumer to gather some initial qualifying information from the consumer and for purposes of accessing a risk associated with a FI providing a loan to the consumer to pay for the transaction. The consumer enters the personal loan information (including identifying information of the consumer) into the interface, and API 124 returns to retail manager 114 along with the amount being requested for the transaction payment.

Retail manager 114 contacts cloud/server API 145 of FI server 140 with the personal information, retailer identifier for the retailer associated with terminal 120, and the transaction amount due as payment by the consumer at terminal 120. API 145 interacts with internal underwriting services and account manager 143 of FI server 140. If additional information is required of the consumer by the FI, such services may text message and/or call the consumer using the consumer identifying information provided in the private information. Assuming the FI's underwriting approves the loan request, the loan terms and available loan options are sent back to retail manager 114 using API 145. Retail manager 114 interacts with API 124 to cause the transaction interface of transaction manager 123 to present the loan terms and loan options for acceptance of the consumer. For example, the loan terms and loan options associated with $500 needed to pay for the consumer transaction with the retailer may be 4 payments of $125 over 4 months, 6 payments of $83.33 over 6 months or 12 months, or $41.67 over 1 year.

Consumer acceptance of a particular available option (note there may be just 1 option such that the consumer has no choice if accepted) is communicated back from API 124 to retail manager 114.

Account manager 113 uses BC API 115 to create a smart contract on BC 160 with a registered wallet identifier associated with the FI 140 and a registered wallet identifier of the consumer. An address associated with the smart contract is returned from BC 160 to BC API 115. Account manager 113 creates a new account or a sub account under an existing account for the FI institution, which is associated with the loan and a wallet identifier of the FI. The loan address on the BC 160 is then provided by account manager 113 to the FI via API 145 and to the consumer via API 124 for displaying within the transaction interface and capturing by a camera of user device 150 by the consumer off a display of terminal 120. Optionally or alternatively, the contract address on the BC 160 is sent directly to user device 150 as a text message utilizing consumer-provided identifying/contact information associated with the private information originally provided by the consumer to apply for the loan.

Upon creation of the contract in the BC 160, account manager 113 supplied wallet identifiers for the FI, the consumer, and the retailer such that when the BC 160 creates the contract on the BC 160 funds used from digital wallet 146 for payment of the transaction are transferred from the digital wallet 146 of the FI to the digital wallet 135 of the retailer. Upon notice of payment, transaction manager 133 notifies transaction manager 123 of terminal 120 that the consumer has paid, and the transaction has successfully completed. The BC-maintained records for the contract automatically updates to record and reflect the transfer of the funds between the wallets, such that the history is maintained for auditing.

In an embodiment, a FI may create a single generic funding contract within the BC 160 with digital wallet 146 with generic terms and a registered source of funds from wallet 146. As new loans are created by account manager 113 on the BC 160 for the FI, these new loans become some contracts and are associated as a hierarchical relationship within the BC 160 based on their addresses (such as parent-child relationships). In this manner, the FI can utilize API 144 with the generic contract address and obtain records associated with each subcontract off the BC 160 or utilize a specific subcontract address via BC API 144 and obtain the terms and records associated with just that subcontract. This permits an investment pool of money to be pre-purchased as cryptocurrency or an ERC20 USDC (Ethereum® token) and stored in digital wallet 146. As consumers accept loans, the cryptocurrency of USDC token are transferred out of wallet 146 and into wallet 135 by the BC 160.

When a consumer is making a payment in accordance with the terms of the loan, the consumer can either utilize an application or an interface provided by the FI to make such a payment or can utilize API 154 to provide the cryptocurrency or a USDC token from wallet 155 to account manager 113, which then access the BC 160 and provides the funding source token, amount, and wallet identifier for wallet 155 utilizing the contract address and BC API 115, causing the payment funds to be transferred from wallet 155 to wallet 146. Again, transfer of the payment funds are recorded and noted on the BC 160 for auditing and account history.

The above-referenced discussion also works when the consumer is making a purchase online through an on-line interface provided by transaction manager 133 of retail server 130. The manner in which the on-line interface's workflow is modified to provide the loan option and the loan gathering and acceptance screens to the consumer is similar to what was discussed above for the in-store consumer purchase utilizing cloud/server API 134 and transaction manager 133 rather than transaction manager 123 and cloud/server API 124.

In an embodiment, the digital wallets 146 of the FIs are held by and managed by wallet manager 116 on behalf of the FI, such that the FI does not actively participate in any cryptocurrency operations. Here, wallet manager 116 may utilize exchange server 170 to purchase USDC tokens and to exchange between cryptocurrencies used by the consumer and US dollar equivalents. When payments are made by the consumer, wallet manager 116 transfers only U.S. dollars to a designated account of the FI. The BC 160 provides the necessary auditing required of the FI and can be retrieved for compliance purposes at any time by the FI using BC API 144 from BC 160.

Account manager 113 maintains the loan addresses generated on the BC 160 as well as the registered wallet identifiers for wallets 155, 146 (which may be maintained on cloud/server 160 as discussed above), and 135. Thus, cloud/server APIs 153, 145, and/or 134 may also be used by the consumer, the FI, and the retailer utilizing a registered identifier for the consumer, the FI, and the retailer for accessing the records and history of a given loan from the BC 160 without the consumer, the FI, or the retailer having to provide the loan address on the BC 160. This provides an assurance to the parties that should a loan address be lost; it is still accessible on the BC 160 and available from cloud/server 110. Account manager 113 may provide other services through registered accounts of the parties, such as display loans and loan addresses on the BC 160 upon login to cloud/server 110 or in the case of retailer displaying transaction payments made via the blockchain 160 in connection with loans upon login. Loans and loan payments may be browsed by the FI through API 145 and account manager 113 hierarchically based on their relationships to one another, by date, by consumer, by retailer paid, etc.

In an embodiment, an investor associated with funding a pool of funds within a given FI's wallet 145 may further be provided the loan address by the FI or authorized by the FI to obtain the address via cloud/server 110 by the FI. So, the investor or investors can access the loan and sub-loans, terms, records, and history via the BC 160 either directly through their own BC API on their devices or through a registered account with cloud/server 110.

In an embodiment, cloud/server 110 maintains its own digital wallet 155 from which fees associated with buy now and pay later transactions can be collected from one or more of the parties automatically from their wallets 155, 146, and/or 135. In an embodiment, the fee payment and fee schedule can be embedded in terms of the contracts created by account manager 113 when the loans are created on the BC 160 such that they are collected and transferred automatically in performance of the terms of the loans from the appropriate parties wallets 155, 146, and/or 135.

Thus, any of the parties consumer, FI, retailer, and cloud/server can access the BC 160 at any time for purposes of retrieving the current history and records associated with a given loan utilizing APIs 153, 154, 144, 145, 134, 135, and/or 115.

System 100 provides a mechanisms by which third-party service provider fees for buy now and pay later options can be eliminated or substantially reduced. There is little to no ongoing cost associated with maintaining and servicing the loans as there is with third-party providers. The loans are created, and payments made to retailers in near real time and are accessible to consumers through enhanced online transaction interfaces and enhanced terminal transaction interfaces. Thus, accessibility is greatly improved over existing third-party provider offerings. Risks associated with repayment of the loans are bore by the FI and not by cloud/server 110. Retailers do not have to worry about lost sales because customers can obtain loans and the retailers payment during the transactions with the retailers utilizing existing hardware and software interfaces of the retailers that require minimal integration effort and no ongoing maintenance costs. Retail staff and special service desks to obtain buy now and pay later options for customers can be eliminated with system 100.

Figure 2:
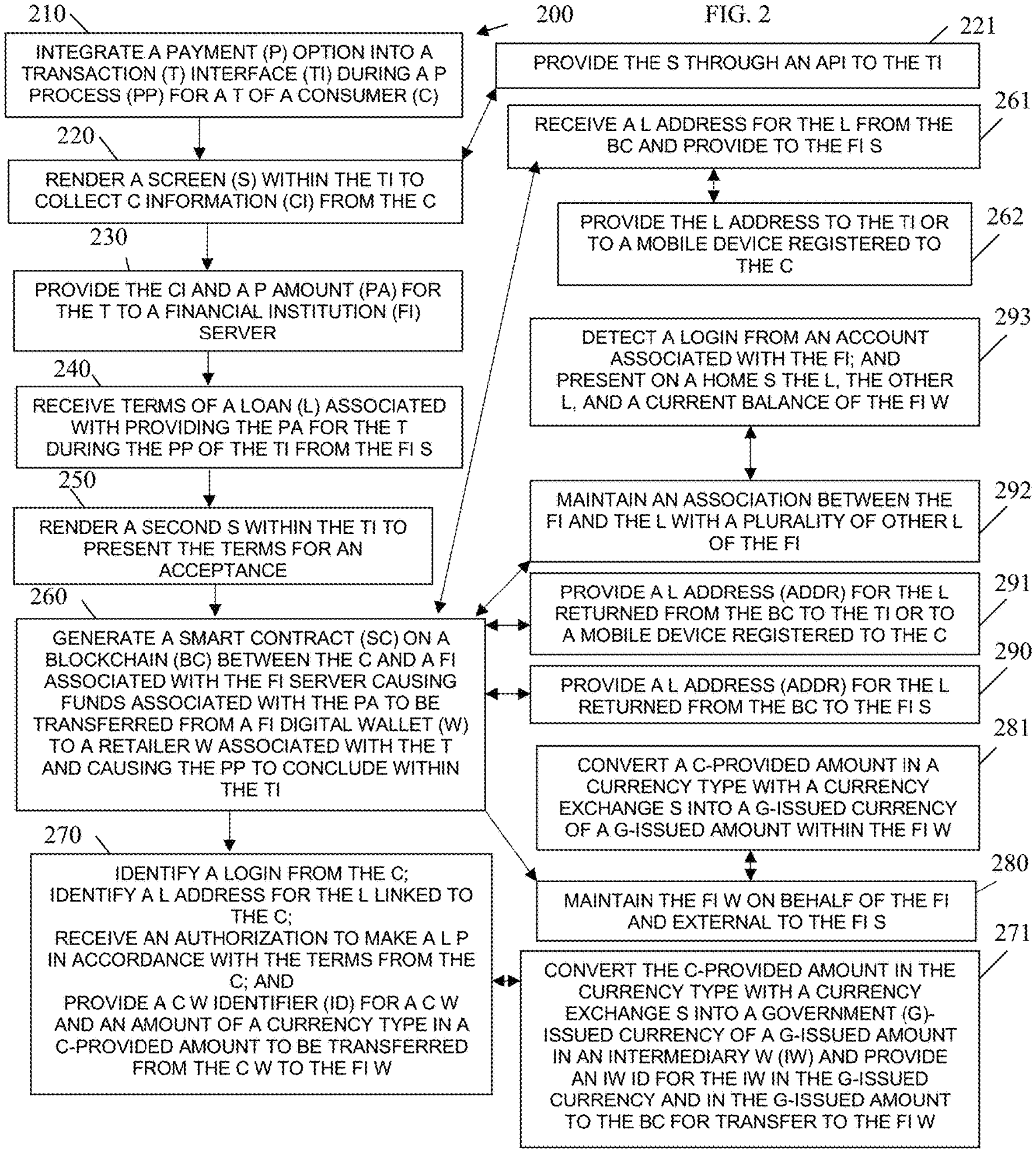
FIG. 2 is a diagram of a method for providing interface and a technique for secure transaction funding, according to an example embodiment.
Figure 3:
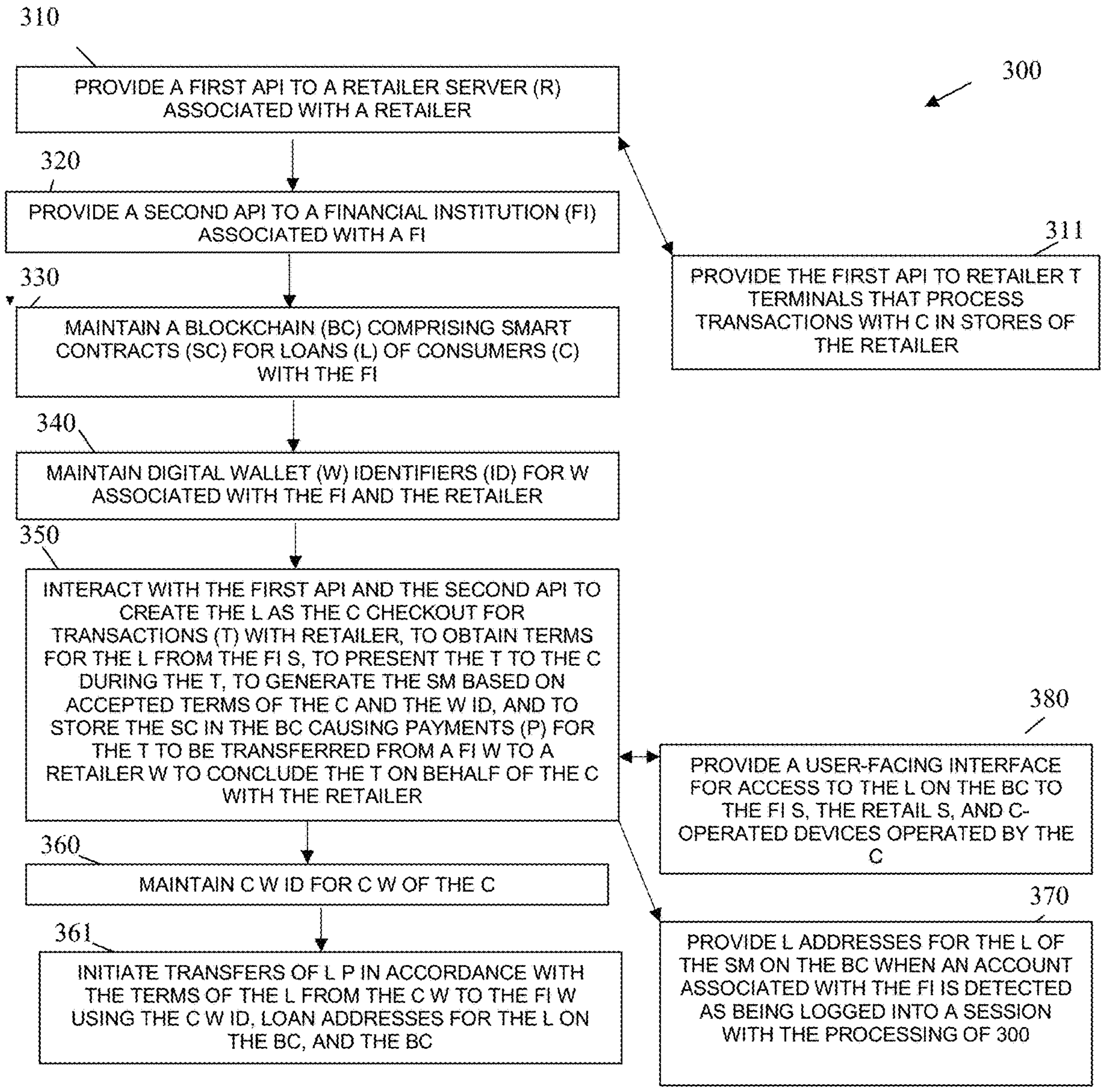
FIG. 3 is a diagram of another method for providing an interface and a technique for secure transaction funding, according to an example embodiment.

The above-referenced embodiments and other embodiments are now discussed within FIGS. 2-3.

FIG. 2 is a diagram of a method 200 for providing an interface and a technique for secure transaction funding, according to an example embodiment. The software module(s) that implements the method 200 is referred to as a "transaction payment facilitation manager." The transaction payment facilitation manager is implemented as executable instructions programmed and residing within memory and/or a non-transitory computer-readable (processor-readable) storage medium and executed by one or more processors of one or more devices. The processor(s) of the device that executes the transaction payment facilitation manager are specifically configured and programmed to process the transaction payment facilitation manager. The transaction payment facilitation manager may have access to one or more network connections during its processing. The network connections can be wired, wireless, or a combination of wired and wireless.

In an embodiment, the device that executes the transaction payment facilitation manager is cloud 110. Cloud 110 comprises a plurality of servers logically cooperating and accessible as a single server 110 (cloud 110).

In an embodiment, the device that executes the transaction payment facilitation manager is a server 110.

In an embodiment, the transaction payment facilitation manager is all or some combination of 113, 114, 115, and/or 116.

At 210, the transaction payment facilitation manager integrates a payment option into a transaction interface during a payment processing for a workflow of a transaction being performed by or on behalf of a consumer with a retailer (on-line or in-store).

At 220, the transaction payment facilitation manager renders a screen within the transaction interface to collect consumer information from the consumer.

In an embodiment, at 221, the transaction payment facilitation manager provides the screen through an API 134 (online) or 124 (at a transaction terminal).

At 230, the transaction payment facilitation manager provides the consumer information and a payment amount for the transaction to a FI server 140.

At 240, the transaction payment facilitation manager receives terms of a loan associated with providing the payment amount for the transaction during the payment processing of the transaction interface from the FI server 140.

At 250, the transaction payment facilitation manager renders a second screen within the transaction interface to present the terms for acceptance to the consumer during the transaction.

At 260, the transaction payment facilitation manager generates a smart contract on a BC 160 between the consumer and a FI associated with the FI server 140. This causes funds associated with the payment amount to be transferred from a FI digital wallet 146 to a retailer wallet 135 associated with the transaction and further causes the payment processing to conclude within the transaction interface.

In an embodiment, at 261, the transaction payment facilitation manager receives a loan address for the loan from the BC 160 and provides the loan address on the BC 160 to the FI server 140.

In an embodiment of 261 and at 262, the transaction payment facilitation manager provides the loan address to the transaction interface for capturing by a mobile device operated by the consumer or provides the loan address to a mobile device registered to the consumer.

In an embodiment, at 270, the transaction payment facilitation manager identifies a login from the consumer. The transaction payment facilitation manager identifies a loan address for the loan linked to the consumer. The transaction payment facilitation manager receives an authorization to make a loan payment in accordance with the terms from the consumer. Finally, the transaction payment facilitation manager provides a consumer wallet identifier for a consumer digital wallet 155 and an amount of a currency type in a consumer-provided amount to be transferred from the consumer digital wallet 155 to the FI digital wallet 146.

In an embodiment of 270 and at 271, the transaction payment facilitation manager converts the consumer-provided amount in the currency type with a currency exchange server 170 into a government-issued currency of a government-issued amount into an intermediary digital wallet and provides an intermediary wallet identifier for the intermediate digital wallet in the government-issued currency and the government-issued amount to the BC 160 for transfer to the FI digital wallet 146.

In an embodiment, at 280, the transaction payment facilitation manager maintains the FI digital wallet on behalf of the FI and external to the FI server 140.

In an embodiment of 280 and at 281, the transaction payment facilitation manager converts a consumer-provided amount in a currency type with a currency exchange server 170 into a government-issued currency of a government-issued currency amount within the FI digital wallet 146.

In an embodiment, at 290, the transaction payment facilitation manager provides a loan address for the loan that is returned from the BC 160 to the FI server 140.

In an embodiment, at 291, the transaction payment facilitation manager provides a loan address for the loan that is returned from the BC 160 to the transaction interface or to a mobile device (user device) 120 registered to the consumer.

In an embodiment, at 292, the transaction payment facilitation manager maintains an association between the FI and the loan with a plurality of other loans of the FI processed through the transaction payment facilitation manager.

In an embodiment of 292 and at 293, the transaction payment facilitation manager detects a login from an account associated with the FI and presents on a home scree the loan, the other loans, and a current balance of the FI digital wallet 146.

FIG. 3 is a diagram of another method 300 for providing an interface and a technique for secure transaction funding, according to an example embodiment. The software module(s) that implements the method 300 is referred to as a "BC smart contract manager." The BC smart contract manager is implemented as executable instructions programmed and residing within memory and/or a non-transitory computer-readable (processor-readable) storage medium and executed by one or more processors of a device. The processors that execute the BC smart contract manager are specifically configured and programmed for processing the BC smart contract manager. The BC smart contract manager may have access to one or more network connections during its processing. The network connections can be wired, wireless, or a combination of wired and wireless.

In an embodiment, the device that executes the BC smart contract manager is cloud 110. In an embodiment, the device that executes the BC smart contract manager is server 110.

In an embodiment, the BC smart contract manager is all of or some combination of 113, 114, 115, 116, 124, 134, 145, 154, and/or method 200 of FIG. 2.

The BC smart contract manager presents another and, in some ways, enhanced processing perspective from that which was discussed above for cloud 110 and method 200.

At 310, the BC smart contract manager provides a first API 134 to a retailer server 130 associated with a retailer.

In an embodiment, the BC smart contract manager provides the first API 124 to retailer transaction terminals 120 that process transaction with consumers in stores of the retailer.

At 320, the BC smart contract manager provides a second API 145 to a FI associated with a FI.

At 330, the BC smart contract manager maintains a BC 160 comprising smart contracts for loans of consumers with the FI.

At 340, the BC smart contract manager maintains digital wallet identifiers for digital wallets associated with the FI and the retailer.

At 350, the BC smart contract manager interacts with the first API (134 and/or 124) and the second API 145 to: create the loans as the consumers checkout for the transactions with the retailer; obtain terms for the loan from the FI server 140; present the terms to the consumers during the transactions; generate the smart contracts based on accepted terms of the consumers; and store the smart contracts in the BC 160 causing payments for the transactions to be transferred from a FI digital wallet 146 to a retailer digital wallet 135 to conclude the transactions on behalf of the consumers with the retailer.

In an embodiment, at 360, the BC smart contract manager maintains consumer wallet identifiers for consumer digital wallets 155 of the consumers.

In an embodiment of 360 and at 361, the BC smart contract manager initiates transfers of loan payments in accordance with the terms of the loans from the consumer digital wallets 155 to the FI digital wallet 146 using the consumer wallet identifiers, the loan addresses for the loans on the BC 160, and the BC 160 using a BC API 115.

In an embodiment, at 370, the BC smart contract manager provides loan addresses for the loans of the smart contracts on the BC 160 when an account associated with the FI is detected as being logged into a session with the BC smart contract manager (method 300).

In an embodiment, at 380, the BC smart contract manager provides a user-facing interface for access to the loans on the BC 160 to the FI server 140, the retailer server 130, and consumer-operated devices 150 operated by the consumers.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

providing a user interface, executed by one or more processors of at least one server of a cloud processing environment, the at least one server comprising a non-transitory computer-readable storage medium comprising instructions, the one or more processors communicating with a financial institution (FI) server of an FI, a retail server of a retailer, and a device operated by a consumer over a communications network, the user interface enabling access to a loan on a blockchain (BC) to the FI server, the retail server, and the device operated by a consumer;

maintaining a consumer digital wallet identifier for a consumer digital wallet of the consumer stored in the non-transitory computer-readable storage medium;

maintaining an association between the FI and the loan with a plurality of other loans of the FI stored in the non-transitory computer-readable storage medium;

detecting a login from an account associated with the FI;

presenting, on a home screen within the user interface, the loan, the plurality of other loans, and a current balance of an FI digital wallet of the FI responsive to detection of the login;

initiating transfers of loan payments in accordance with terms of the loan from the consumer digital wallet to an FI digital wallet of the FI using the consumer digital wallet identifier of the consumer and a loan address for the loan on the BC;

generating the loan as a smart contract on the BC comprising the terms binding the consumer and the FI, wherein the smart contract automatically executes the transfers of the loan payments from the consumer digital wallet to the FI digital wallet based on the terms embedded within the smart contract on the BC;

configuring the smart contract on the BC to verify an authenticity of the loan payments by checking a transaction associated with the consumer against the terms of the loan stored on the BC before recording the transaction; logging each loan payment transfer in a transaction ledger on the BC, wherein the transaction ledger is accessible through the user interface; automatically initiating the loan payments on a schedule predetermined according to the terms of the loan; sending notifications of each payment initiation to the device operated by the consumer;

detecting the FI logged into a session; and providing the loan address for the loan to the smart contract on the BC responsive to detection of an account based on the FI being logged into the session, wherein the one or more processors communicate with the FI server via a first application programming interface (API) and with the retail server via a second API, the first API and the second API facilitating exchange of loan payment data between the at least one server, the FI server, and the retail server over the communications network.

2. The method of claim 1, further comprising displaying, by the one or more processors, via the user interface, real-time updates of BC transactions related to the loan, including status updates on the loan payments and loan receipts, wherein the real-time updates are retrieved by the one or more processors from the BC via a blockchain API executing on the non-transitory computer-readable storage medium.

3. The method of claim 1, further comprising providing, via the user interface, functionality for adjusting the terms of the loan, subject to approval from the FI, wherein the adjusted terms are updated on the smart contract on the BC by the one or more processors via the blockchain API.

4. The method of claim 1, further comprising the one or more processors configuring the smart contract on the BC to automatically update a loan balance on the consumer digital wallet and the FI digital wallet after each payment transfer, wherein the update is recorded on the BC and accessible through the user interface via the blockchain API.

5. A system, comprising:

a cloud processing environment comprising at least one server;

the at least one server comprising:

one or more processors, one or more non-transitory computer-readable storage mediums comprising instructions;

a network interface through which the one or more processors communicate with a financial institution (FI) server of an FI, a retail server of a retailer, and a device operated by a consumer over a communications network; and the instructions when executed by the one or more processors cause the one or more processors to perform operations comprising:

initiating a session with a consumer to enable access to a loan on a blockchain (BC) via a user interface provided by the at least one server associated with the FI server, the retail server, and the device operated by the consumer;

maintaining a consumer digital wallet identifier for a consumer digital wallet of the consumer in the one or more non-transitory computer-readable storage mediums;

maintaining an association between the FI and the loan with a plurality of other loans of the FI in the one or more non-transitory computer-readable storage mediums;

detecting a login from an account associated with the FI;

presenting, on a home screen within a user interface, the loan, the plurality of other loans, and a current balance of an FI digital wallet of the FI responsive to detection of the login;

initiating transfers of loan payments in accordance with terms of the loan from the consumer digital wallet to an FI digital wallet of the FI using the consumer digital wallet identifier of the consumer and a loan address for the loan on the BC, wherein the loan address is a blockchain address on the BC identifying a smart contract for the loan;

generating the loan as the smart contract on the BC comprising the terms binding the consumer and the FI, wherein the smart contract automatically executes the transfers of the loan payments from the consumer digital wallet to the FI digital wallet based on the terms embedded within the smart contract on the BC;

configuring the smart contract on the BC to verify an authenticity of the loan payments by checking a transaction associated with the consumer against the terms of the loan stored on the BC before recording the transaction; logging each loan payment transfer in a transaction ledger on the BC, wherein the transaction ledger is accessible through the user interface; automatically initiating the loan payments on a schedule predetermined according to the terms of the loan; sending notifications of each payment initiation to the device operated by the consumer; and providing the loan address for the loan to the smart contract on the BC responsive to detection of an account associated with the FI logging into another session, wherein the one or more processors communicate with the FI server via a first application programming interface (API) and with the retail server via a second API, the first API and the second API facilitating exchange of loan payment data between the at least one server, the FI server, and the retail server over the communications network.

6. The system of claim 5, wherein the operations further comprise:

updating the terms of the loan on the smart contract in response to changes in the terms of the loan agreed upon by the consumer and the FI during a lifecycle of the loan, wherein the updated terms are recorded on the BC and the one or more processors transmit a notification of the updated terms to the device operated by the consumer via the communications network.

* * * * *